United States Patent [19]

Kasahara et al.

[11] Patent Number: 5,449,504
[45] Date of Patent: Sep. 12, 1995

[54] PROCESS FOR REMOVING NITROGEN OXIDES FROM OXYGEN RICH EXHAUST GAS

[75] Inventors: Senshi Kasahara; Shunji Inoue; Kazuo Sekitani; Kazuhiko Sekizawa; Hiroshi Miura; Hironobu Hosose, all of Shinnanyo; Shirou Nakamura, Tokuyama, all of Japan

[73] Assignee: Tosoh Corporation, Shinnanyo, Japan

[21] Appl. No.: 160,843

[22] Filed: Dec. 3, 1993

[30] Foreign Application Priority Data

| | | | |
|---|---|---|---|
| Dec. 3, 1992 | [JP] | Japan | 4-324463 |
| Dec. 3, 1992 | [JP] | Japan | 4-324464 |
| Dec. 3, 1992 | [JP] | Japan | 4-324465 |
| Dec. 3, 1992 | [JP] | Japan | 4-324466 |
| Aug. 26, 1993 | [JP] | Japan | 5-211621 |

[51] Int. Cl.$^6$ .............................. C01B 21/04
[52] U.S. Cl. ..................... 423/239.2; 423/213.2
[58] Field of Search .................. 423/213.2, 239.2

[56] References Cited

U.S. PATENT DOCUMENTS

| | | | |
|---|---|---|---|
| 5,013,700 | 5/1991 | Falth | 502/79 |
| 5,223,236 | 6/1993 | Inoue et al. | 423/213.2 |
| 5,236,879 | 8/1993 | Inoue et al. | 502/73 |
| 5,270,024 | 12/1993 | Kasahara et al. | 423/213.2 |

FOREIGN PATENT DOCUMENTS

| | | |
|---|---|---|
| 0027397 | 2/1983 | European Pat. Off. |
| 0286967 | 10/1988 | European Pat. Off. |
| 0295471 | 12/1988 | European Pat. Off. |
| 0377975 | 7/1990 | European Pat. Off. |
| 60-125250 | 7/1985 | Japan . |
| 63-100919 | 5/1988 | Japan . |
| 4271843 | 9/1992 | Japan . |

*Primary Examiner*—Michael Lewis
*Assistant Examiner*—Thomas G. Dunn, Jr.
*Attorney, Agent, or Firm*—Oblon, Spivak, McClelland, Maier & Neustadt

[57] ABSTRACT

A process for removing nitrogen oxides from oxygen rich exhaust gas containing nitrogen oxides and hydrocarbons using a catalyst composed of at least one active metal and zeolite having a molar ratio of $SiO_2/Al_2O_3$ of at least 15, treated with a vapor of at least one silicon compound selected from alkylchlorosilanes, alkoxysilanes, alkoxyalkylsilanes, and silicon tetrachloride or treated with an alkoxysilane or silicon tetrachloride in an organic solvent.

3 Claims, No Drawings

PROCESS FOR REMOVING NITROGEN OXIDES FROM OXYGEN RICH EXHAUST GAS

BACKGROUND OF THE INVENTION

1. Field of the Invention

The present invention relates to a process for treating an oxygen rich exhaust gas containing nitrogen oxides, exhausted from a boiler, automobile engine, etc. with a catalyst. More specifically, it relates to a process for removing nitrogen oxides using a catalyst extremely superior durability.

The term "oxygen rich exhaust gas" used herein is intended to mean an exhaust gas containing oxygen in an amount exceeding the amount of oxygen necessary for completely oxidizing reducing agent such as carbon monoxide, hydrocarbons contained in the exhaust gas. Specific examples of such an exhaust gas include exhaust gases discharged, for example, from internal combustion engines of automobiles operating at a high air/fuel ratio (i.e., in the lean burn region).

2. Description of the Related Art

The processes for removing nitrogen oxides from an exhaust gas discharged from boilers, automobile engines, and the like, which are practically used, are the process of selective catalytic reduction using ammonia in the presence of a catalyst or the process of non-selective catalytic reduction which passes the exhaust gas through a catalyst and reduces it with the unburnt carbon monoxide and hydrocarbons.

Japanese Unexamined Patent Publication (Kokai) No. 60-125250 proposes a copper ion-exchanged zeolite as a catalyst capable of directly catalytic decomposing nitrogen oxides in the absence of a reducing agent.

For purifying the exhaust gas of diesel engines or lean burn engines designed for reduced fuel consumption, further, there has been proposed a catalyst which includes a base (or non noble) metal in the zeolite etc. as a catalyst capable of selectively reducing the nitrogen oxides by the reducing agents of the unburnt carbon monoxide, hydrocarbons, etc. even in an oxygen rich atmosphere (Japanese Unexamined Patent Publication (Kokai) No. 63-100919).

These proposed catalysts, however, suffer from problems, in particular their durability at a high temperature, and therefore, are not yet suitable for practical use.

Therefore, attempts were made to improve the durability of the zeolite in the presence of steam at high temperature by substituting the aluminum near the surface of the zeolite with silicon whereby the outer surface of the zeolite is made hydrophobic (Japanese Unexamined Patent Publication (Kokai) No. 4-271843). With this proposed process, however, ammonium silicofluoride was used for the silicon substitution in an aqueous solution, and therefore, part of the ammonium silicofluoride in the aqueous solution was hydrolyzed and produced fluoric acid. This caused dealumination in the zeolite bulk and therefore the sufficient durability could not be obtained.

SUMMARY OF THE INVENTION

The object of the present invention is to provide a process for efficiently purifying an exhaust gas, in particular an oxygen rich exhaust gas discharged from an internal combustion engine of, for example, an automobile, without using a reducing agent, for example, ammonia and for purifying an exhaust gas using a catalyst superior in durability at a high temperature in the presence of steam.

The present inventors engaged in intensive studies on the above problem and, as a result, discovered that by using a catalyst obtained by treating zeolite with a specific silicon compound, it is possible to efficiently purify an exhaust gas even after use at a high temperature and thus perfected the present invention.

In accordance with the present invention, there is provided a process for removing nitrogen oxides from an oxygen rich exhaust gas containing nitrogen oxides and hydrocarbons using a catalyst composed of at least one active metal and a zeolite having a molar ratio of $SiO_2/Al_2O_3$ of at least 15, treated with (1) a vapor of alkylchlorosilane,
(2) a vapor of alkoxysilane or a vapor of alkoxyalkylsilane,
(3) an alkoxysilane in an organic solvent,
(4) a vapor of silicon tetrachloride, and/or
(5) silicon tetrachloride in an organic solvent.

DESCRIPTION OF THE PREFERRED EMBODIMENTS

The present invention will now be explained in further detail.

The molar ratio of the $SiO_2/Al_2O_3$ of the zeolite usable in the present invention should be 15 or more after various treatments. There is no upper limit on the molar ratio of the $SiO_2/Al_2O_3$. If the molar ratio of the $SiO_2/Al_2O_3$ is less than 15, a sufficient durability cannot be obtained.

The type of the zeolite is not particularly limited either. For example, use may be made of mordenite, ferrierite, ZSM-5, ZSM-8, ZSM-11, ZSM-12, ZSM-20, ZSM-35, or other zeolites, but among these ZSM-5 is preferably used. The processes for producing these zeolites are also not limited. Further, they may also be dealuminated zeolites, such as zeolite Y and zeolite L.

The zeolite usable is one as synthesis or after calcination. It is also possible to use the zeolite ion-exchanged with proton or ammonium by treating with an ammonium salt or a mineral acid etc. Further, use may be made of one ion exchange with, for example, potassium, cesium, barium.

The zeolite may have part of the aluminum in the zeolite framework substituted with silicon due to the alkylchlorosilane vapor treatment. To prevent such substitution, a metal ion-exchanged zeolite is preferably used, although an ammonium or proton ion-exchanged zeolite may be used. Further, when treating with a silicon tetrachloride vapor, if a slight amount of moisture is contained in the gas containing the silicon tetrachloride, there is a possibility of production of hydrochloric acid due to the hydrolysis, and therefore, there is a possibility of dealumination in the zeolite bulk, but even in this case, a metal ion-exchanged zeolite is preferably used, although an ammonium or proton ion-exchanged zeolite may be used. Preferably, use is made of the cesium ion-exchange zeolite.

The various treatment processes for the zeolite will now be explained.

The order of the treatment with the alkylchlorosilane vapor and the introduction of the active metal thereinto is not particularly limited. The zeolite may be treated with an alkylchlorsilane vapor and then the active metal introduced, or the active metal may be introduced, followed by treating with the alkylchlorosilane vapor.

The alkylchlorosilane usable in the present invention should be those capable of entering into the zeolite micro pores in order to insert silicon into the lattice defects of zeolite framework. As the alkyl group, use may be made of, for example, the methyl group, ethyl group, propyl group, butyl group. Use may be made of alkyltrichlorosilane, dialkyldichlorosilane, or trialkylchlorosilane. When treating the zeolites with smaller micro pore, such as ZSM-5, ferrierite, further, use is preferably made of those with the small molecular diameter, such as trimethylchlorosilane and triethylchlorosilane.

The conditions for the treatment with the alkylchlorosilane vapor are not particularly limited. It is sufficient if a gas containing alkylchlorosilane is brought into contact with a raw zeolite or a zeolite containing at least one active metal to perform the treatment in the gaseous phase. In the treatment in an aqueous solution, the alkylchlorosilane is decomposed to form oxides etc., and therefore, the silicon is not inserted into the lattice defects. Further, the decomposition of the alkylchlorosilane produces hydrochloric acid, which causes dealumination in the zeolite bulk. Therefore, the treatment in the aqueous solution may lower the durability of catalyst.

The concentration of the alkylchlorosilane in the treatment gas is not particularly limited, but in view of the operability, it is preferable to dilute the alkylchlorosilane to a concentration of 1-50% by weight. As the diluting gas, use may be made of any gas where alkylchlorosilane can remain stably. For example, use may be made of nitrogen or helium. If moisture (i.e. $H_2O$) is contained in the diluting gas, the alkylchlorosilane is converted to, for example, oxides and therefore, the moisture in the treatment gas preferably is made as low as possible.

The temperature of the alkylchlorosilane vapor treatment is not particularly limited. It is sufficient if the alkylchlorosilane can remain stably as a gas. Further, at high temperatures, there is the possibility of destruction of the zeolite, and therefore, a temperature from a room temperature to 800° C. is preferable.

The process for the alkylchlorosilane vapor treatment is not particularly limited. Use may be made of a process for treating the zeolite in a sealed container filled with a gas containing alkylchlorosilane or passing the gas containing alkylchlorosilane through a bed packed with zeolite. The space velocity in the case of passing the gas containing alkylchlorosilane through a bed should be 10 to 10,000 $hr^{-1}$. Further, the treatment time may be 10 minutes to 30 hours.

The order of the treatment by the alkoxysilane or the alkoxyalkylsilane vapor and the introduction of the active metal is not particularly limited. The zeolite may be treated by the alkoxysilane or the alkoxyalkylsilane vapor and then the active metal introduced, or the active metal may be introduced, followed by treating with the alkoxysilane or the alkoxyalkylsilane vapor.

The alkoxysilane usable in the present invention is a tetraalkoxysilane, while the alkoxyalkylsilane is an alkoxytrialkylsilane, dialkoxydialkylsilane, or trialkoxyalkylsilane. As the alkoxyl group, use may be made of the methoxyl group, ethoxyl group, propoxyl group, butoxyl group, etc. As the alkyl group, use may be made of the methyl group, ethyl group, propyl group, butyl group, etc.

The conditions for the treatment by the alkoxysilane or the alkoxyalkylsilane vapor are not particularly limited. It is sufficient if a gas containing the alkoxysilane or the alkoxyalkylsilane is brought into contact with the raw zeolite or a zeolite containing at least one active metal to perform the treatment in the gaseous phase.

The concentration of the alkoxysilane or the alkoxyalkylsilane in the treatment gas is not particularly limited, but in view of the operability, it is preferable to dilute the alkoxysilane or the alkoxyalkylsilane to a concentration of 1-50% by weight. As the diluting gas, use may be made of any gas where alkoxysilane or alkoxyalkylsilane can remain stably. For example, use may be made of nitrogen or helium. If moisture is contained in the diluting gas, the alkoxysilane or the alkoxyalkylsilane is converted to, for example, oxides, and therefore, will not homogeneously deposit on the surface of the zeolite, and therefore, the moisture in the treatment gas preferably is made as low as possible.

The temperature of the alkoxysilane or the alkoxyalkylsilane vapor treatment is not particularly limited. It is sufficient if the alkoxysilane or the alkoxyalkylsilane can remain stably as a gas. Further, at high temperatures, there is the possibility of the decomposition of the hydroxyl groups on the surface of the zeolite, which can be reacted with the alkoxyl groups, and therefore a temperature from room temperature to 800° C. is preferable.

The process for the alkoxysilane or the alkoxyalkylsilane vapor treatment is not particularly limited. Use may be made of a process for treating the zeolite in a sealed container filled with a gas containing alkoxysilane or alkoxyalkylsilane or passing the gas containing alkoxysilane or alkoxyalkylsilane through a bed packed with zeolite. The space velocity in the case of passing the alkoxysilane or the gas containing alkoxyalkylsilane through a bed should be 10 to 10,000 $hr^{-1}$. Further, the treatment time should be 10 minutes to 30 hours.

The order of the treatment by the alkoxysilane in an organic solvent and the introduction of the active metal is not particularly limited. The zeolite may be treated by alkoxysilane in an organic solvent and, then, the active metal introduced, or the active metal may be introduced, followed by treating with the alkoxysilane in an organic solvent.

The alkoxysilane usable in the present invention is tetraalkoxysilane. As the alkoxyl group, use may be made of the methoxyl group, ethoxyl group, propoxyl group, butoxyl group, etc.

The conditions for the treatment by the alkoxysilane in an organic solvent are not particularly limited. It is sufficient if the raw zeolite or a zeolite containing at least one active metal is added to an organic solvent containing alkoxysilane to perform the treatment in a liquid phase.

The concentration of the alkoxysilane in the organic solvent is not particularly limited, but is preferably 0.1 to 20% by weight. As the organic solvent, a solvent in which the alkoxysilane can remain stably may be used. For example, use may be made of, for example, cyclohexane, hexane, toluene, benzene. If $H_2O$ is contained in an organic solvent, the alkoxysilane may be converted to, for example, oxides and no longer be homogeneously coated, and therefore, the $H_2O$ content in an organic solvent preferably is made as low as possible. Further, if water is used as the solvent, the alkoxysilane precipitates as, for example, oxides and homogeneous coating is not possible.

The temperature of the alkoxysilane treatment in an organic solvent is not particularly limited. It is sufficient if the alkoxysilane can remain stably and the reaction with the hydroxyl groups on the surface of the zeolite can proceed. The treatment is carried out at a temperature from room temperature to the boiling point of the organic solvent used.

The process for the treatment by the alkoxysilane in an organic solvent is not particularly limited, but it is possible to mix the zeolite in an organic solvent containing alkoxysilane and then disperse the same therein by stirring or irradiation by ultrasonic waves. To prevent the treated zeolite from having any excess alkoxysilane adhered to it, the liquid-solid separation is preferable. Further, the resultant product may be washed using an organic solvent.

The conditions for the treatment with the silicon tetrachloride vapor are not particularly limited. It is sufficient if a gas containing silicon tetrachloride is brought into contact with the zeolite to perform the treatment in the gaseous phase.

The concentration of the silicon tetrachloride in the treatment gas is not particularly limited, but in view of the operability, it is preferable to dilute the silicon tetrachloride to a concentration of 1 to 50% by weight. As the diluting gas, use may be made of any gas where silicon tetrachloride can remain stably. For example, use may be made of nitrogen or helium. If moisture is contained in the diluting gas, the silicon tetrachloride is converted to, for example, oxides, and therefore, the moisture in the treatment gas preferably is made as low as possible.

The temperature of the silicon tetrachloride vapor treatment is not particularly limited. It is sufficient if the silicon tetrachloride can remain stably as a gas. Further, at high temperatures, there is the possibility of destruction of the zeolite, and therefore, a temperature from room temperature to 800° C. is preferable.

The process for the silicon tetrachloride vapor treatment is not particularly limited. Use may be made of a process for treating the zeolite in a sealed container filled with a gas containing silicon tetrachloride or passing the gas containing silicon tetrachloride through a bed packed with zeolite. The space velocity in the case of passing the gas containing silicon tetrachloride through a bed should be 10 to 10,000 hr$^{-1}$. Further, the treatment time should be 10 minutes to 30 hours.

The order of the introduction of the active metal and the treatment by the silicon tetrachloride in an organic solvent is not particularly limited. The zeolite may be treated by the silicon tetrachloride in an organic solvent and then the active metal may be introduced or the active metal may be introduced, followed by treating with the silicon tetrachloride in an organic solvent.

The conditions for the treatment with the silicon tetrachloride in an organic solvent are not particularly limited. It is sufficient if the raw zeolite or a zeolite containing at least one active metal is added to an organic solvent containing the silicon tetrachloride to perform the treatment in a liquid phase.

The concentration of the silicon tetrachloride in an organic solvent is not particularly limited, but is preferably 0.1 to 20% by weight. As the organic solvent, a solvent in which the silicon tetrachloride can remain stably may be used. For example, use may be made of, for example, hexane, cyclohexane, toluene, benzene. If $H_2O$ is contained in an organic solvent, the silicon tetrachloride may be converted to, for example, oxides, and therefore, the $H_2O$ in an organic solvent preferably is removed as much as possible. Further, if water is used as the solvent, the silicon tetrachloride precipitates as oxides etc. and a catalyst superior in the durability cannot be obtained.

The temperature of the silicon tetrachloride treatment in the organic solvent is not particularly limited. It is sufficient if the silicon tetrachloride can remain stably and the reaction with the hydroxyl groups on the surface of the zeolite can proceed. The treatment is carried out at a temperature from room temperature to the boiling point of the organic solvent used.

The zeolite treated with the silicon tetrachloride in an organic solvent preferably is subjected to solid-liquid separation so that the excess silicon tetrachloride is not allowed to deposit. Alternatively, the silicon tetrachloride can be removed by washing using an acid, organic solvent, etc. or by reduced pressure.

When performing the treatment by the various silicon compounds, it is preferable to remove the $H_2O$ absorbing on the zeolite and activate the hydroxyl groups on the surface of the zeolite by pretreatment at 300° to 800° C. in a vacuum or in an inert gas or a dried air atmosphere.

The silicon compound-treated zeolite may be treated to further stabilize the silicon layer on the surface of the zeolite and to remove impurities by thermal treatment at a temperature of 100° to 800° C. under a vacuum or under an inert gas or dried air atmosphere.

The molar ratio of the $SiO_2/Al_2O_3$ of the silicon compound-treated zeolite must be at least 15. If the molar ratio of the $SiO_2/Al_2O_3$ is less than 15, sufficient durability at a high temperature cannot be obtained. Further, no upper limit is particularly given, but it is preferable that it be no more than 200 to ensure sufficient catalytic activity.

When treated by various silicon compounds, the silicon is introduced into the lattice defects on the zeolite surface, and therefore, the molar ratio of the $SiO_2/Al_2O_3$ may rise somewhat as well.

The silicon compound-treated zeolite has one or more active metals introduced in it. As the active metal, any metal which is ordinarily used for the purification of exhaust gas may be used, for example, metals of the Group Ib such as copper, silver, gold, metals of the Gruop VIII such as iron, cobalt, nickle, ruthenium, rhodium, palladium, platinum, metals of the Group VIa such as chromium, molybdenum, and metals of the Group VIIa such as manganese may be used. Particularly preferable are copper or cobalt.

The method of introduction of the active metal is not particularly limited. Use may be made of techniques such as an impregnation method or an ion exchange method. The active metal exhibits a high activity even in a state loaded on the surface of the zeolite, but when present at an ion exchange site of the zeolite, the activity and durability becomes higher , and therefore, it is preferable to introduce the active metal by the ion exchange method. In the ion exchange method, the silicon compound-treated zeolite is mixed into an aqueous solution containing salts of the active metal and then is stirred and washed.

As the salts of the active metal, use may suitably be made of chlorides, nitrates, sulfates, acetates, and other salts of the active metals. Further, use may suitably be used of, for example, ammine complex salts of active metals.

In the ion-exchange process, the amount of addition of the active metals, concentration, exchange temperature, time, etc. are not particularly limited. The conventional methods may be used. The amount of addition of the active metal is preferably 0.5 to 20 times higher than the aluminum atom in the silicon compound treated zeolite so as to give sufficient activity and durability. Further, the concentration of the ion exchange slurry is preferably 5 to 50% be weight as usual. The ion exchange temperature and time are preferably a temperature from room temperature to 100° C. and a time of 5 minutes to 3 days so as to give sufficient activity and durability. Further, when needed, the ion exchange operation may be repeatedly performed.

In the above way, the exhaust gas purification catalyst used in the present invention can be prepared.

It is also possible to introduce one or more active metals into the zeolite and, then, treat the same with a silicon compound to form an exhaust gas purification catalyst.

The molar ratio of the $SiO_2/Al_2O_3$ of the exhaust gas purification catalyst having the active metal introduced as used in the present invention is substantially no different from the molar ratio of the $SiO_2/Al_2O_3$ of the silicon compound treated zeolite. Further the crystalline structure of the exhaust gas purification catalyst is not substantially different before or after the silicon compound treatment or before or after the ion exchange.

The exhaust gas purification catalyst used in the present invention may be used after mixed with a binder such as a clay mineral and molded into a specific form. Further, it is also possible to mold the raw zeolite or the zeolite treated with a silicon compound or having the active metal introduced and, then, treat the molded article with silicon compounds or introduce active metals in it. As the binder usable when molding zeolite, there are kaolin, attapulgite, montmorillonite, bentonite, allophane, sepiolite, and other clay minerals. Alternatively, it is possible to use a binderless zeolite molded article obtained by directly synthesizing the molded article without use of a binder. In addition, use may be made of the exhaust gas purification catalyst used in the present invention to give a wash coat to a cordierite or metal honeycomb support.

The exhaust gas purification catalyst prepared in this way is made to contact with the oxygen rich exhaust gas containing the nitrogen oxides and hydrocarbons to remove the nitrogen oxides. The exhaust gas usable in the present invention must contain nitrogen oxides and hydrocarbons and excess oxygen, but the invention is also effective in the case that carbon monoxide, hydrogen, ammonia, etc. are contained.

The space velocity, temperature, etc. at the removal of the nitrogen oxides are not particularly limited, but a space velocity of 100 to 500,000 $hr^{-1}$ and a temperature of 200° to 800° C. are preferable.

EXAMPLES

The present invention will now be explained in further detail using examples. These examples, however, do not restrict the invention in any way.

EXAMPLE 1

ZSM-5 type zeolite was prepared in accordance with Example 1 of Japanese Examined Patent Publication (Kokoku) No. 46-10064. The resultant ZSM-5 type zeolite had the following composition expressed by oxides on an anhydrous basis:
$0.5Na_2O$, $Al_2O_3$, $33SiO_2$ A 50 g amount of the ZSM-5 type zeolite was added to 500 cc of an aqueous solution containing 37.8 g of cesium chloride, and this mixture was stirred at 60° C. for 20 hours, then the solid product was washed, to perform a cesium ion-exchange operation. This operation was repeated two times, and then the resultant product was dried to obtain the cesium ion-exchanged ZSM-5.

A 10 g amount of the resultant cesium ion-exchanged ZSM-5 was pakced in a reaction tube, then this was pretreated under a helium flow at 500° C. for one hour to remove the $H_2O$ adsorbed on the zeolite. Next, 60 cc/min of helium gas containing 5% trimethyl chlorosilane was passed through a zeolite bed at room temperature for 1 hour. Thereafter, the sample was calcined at 550° C. for 3 hours under a helium flow. The molar ratio of the $SiO_2/Al_2O_3$ of the treated zeolite was 34.

The zeolite treated with trimethyl chlorosilane vapor was added to 45 cc of an aqueous solution of 0.1 mol/liter copper acetate, and this mixture was adjusted to a pH of 10.5 by adding ammonia water and stirred at room temperature for 20 hours, then the solid product was washed, to subject to a copper ion exchange operation. The operation was repeated two times, then the sample was dried to obtain the catalyst 1. As a result of chemical analysis, the catalyst had the following composition expressed by the molar ratio of the oxides on an anhydrous basis:
$0.95CuO$, $0.22Cs_2O$, $Al_2O_3$, $34SiO_2$

EXAMPLE 2

Example 1 was repeated except that an ammonium ion-exchange was carried out instead of the cesium ion-exchange, to prepare the catalyst 2. The ammonium ion-exchange was carried out by adding 50 g of a ZSM-5 type zeolite to 500 cc of an aqueous solution containing 5 g of $NH_4Cl$ and, then, stirring at 60° C. for 20 hours, followed by washing (this operation was repeated twice) and dried.

The zeolite treated with trimethyl chlorosilane vapor had a $SiO_2/Al_2O_3$ molar ratio of 34.

Further, the catalyst 2 (after the Cu ion exchange) had the following composition expressed by the molar ratio of the oxides on an anhydrous basis:
$1.04CuO$, $Al_2O_3$, $34SiO_2$

EXAMPLE 3

The same procedure was followed as in Example 1 to prepare the ZSM-5 type zeolite. The resultant ZSM-5 type zeolite had the following composition expressed by the molar ratio of the oxides on an anhydrous basis:
$0.5Na_2O$, $Al_2O_3$, $33SiO_2$ A 10 g amount of the ZSM-5 type zeolite was added to 45 cc of an aqueous solution of 0.1 mol/liter copper acetate, and this mixture was adjusted to a pH of 10.5 by adding ammonia water, then was stirred at room temperature for 20 hours, then the solid product was washed, to subject to a copper ion-exchange operation. The operation was repeated two times.

The resultant Cu ion-exchanged ZSM-5 was packed in a reaction tube, then this was pretreated under a helium stream at 500° C. for 1 hour to remove the $H_2O$ adsorbed on the zeolite. Next, 60 cc/min of helium gas containing 5% trimethylchlorosilane was passed through a zeolite bed at room temperature for 1 hour. Thereafter, the sample was calcined at 550° C. for 3 hours under a helium flow to obtain the catalyst 3. As a result of chemical analysis, the zeolite had the following composition expressed by the molar ratio of the oxides on an anhydrous basis:
1.04CuO, Al$_2$O$_3$, 34SiO$_2$

EXAMPLE 4

The same procedure was followed as in Example 1 to obtain the catalyst 4, except that use was made of dimethyldichlorosilane instead of trimethylchlorosilane.

The molar ratio of the SiO$_2$/Al$_2$O$_3$ of the zeolite treated with the dimethyldichlorosilane vapor was 34.

The catalyst 4 (after the copper ion-exchange) had the following composition expressed by the molar ratio of the oxides on an anhydrous basis:
0.91CuO, 0.25Cs$_2$O, Al$_2$O$_3$, 34SiO$_2$

EXAMPLE 5

The same procedure was followed as in Example 1 to obtain the catalyst 5, except that use was made of methyltrichlorosilane instead of trimethylchlorosilane.

The molar ratio of the SiO$_2$/Al$_2$O$_3$ of the zeolite treated with the methyltrichlorosilane vapor was 34.

Catalyst 5 had the following composition expressed by the molar ratio of the oxides on an anhydrous basis:
0.90CuO, 0.24Cs$_2$O, Al$_2$O$_3$, 34SiO$_2$

EXAMPLE 6

The same procedure was followed as in Example 1 to obtain the catalyst 6, except that a cobalt ion-exchange was performed instead of the copper ion-exchange. The cobalt ion-exchange was performed as follows:

The zeolite treated by the trimethylchlorosilane vapor was added to 90 cc of an aqueous solution of 0.27 mol/liter cobalt (II) acetate, and this mixture was stirred at 60° C. for 20 hours, then the solid product was washed, to subject to a cobalt ion-exchange. The operation was repeated two times, then the zeolite was dried to obtain the catalyst 6.

The catalyst 6 had the following composition expressed by the molar ratio of the oxides on an anhydrous basis:
1.4CoO, 0.20Cs$_2$O, Al$_2$O$_3$, 34SiO$_2$

EXAMPLE 7

The durability was evaluated using the catalysts 1 to 6 obtained in Examples 1 to 6.

Each catalyst was press-molded and then pulverized to regulate the size of granules to 12 to 20 mesh. A 2 cc volume of each of the granular catalysts was packed in an atmospheric fixed bed reaction tubes, then a gas (Table 1) simulating the exhaust gas of a lean burn engine was passed at a space velocity of 120,000/hr. The samples were treated at 800° C. for 5 hours, then the steady-state purification activities at different temperatures were measured. The steady-state purification activity was expressed by the NOx conversion after holding at each temperature for 1 hour.

The results are shown in Table 2.

TABLE 1

| Gas | Composition |
| --- | --- |
| CO | 0.12 vol % |
| C$_3$H$_6$ | 0.08 vol % |
| NO | 0.12 vol % |
| O$_2$ | 4 vol % |
| CO$_2$ | 12 vol % |
| H$_2$O | 10 vol % |
| N$_2$ | balance |

TABLE 2

| Catalyst No. | NOx conversion (%) | | |
| --- | --- | --- | --- |
| | 300° C. | 400° C. | 500° C. |
| Catalyst 1 | 3 | 13 | 20 |
| Catalyst 2 | 3 | 12 | 18 |
| Catalyst 3 | 2 | 11 | 18 |
| Catalyst 4 | 1 | 9 | 17 |
| Catalyst 5 | 2 | 10 | 17 |
| Catalyst 6 | 1 | 10 | 19 |

COMPARATIVE EXAMPLE 1

The same procedure was followed as in Example 1 to obtain a Cu ion-exchanged ZSM-5 (Comparative catalyst 1), except that no trimethylchlorosilane vapor treatment of Example 1 was performed. As a result of a chemical analysis, the zeolite had the following composition expressed by the molar ratio of oxides on an anhydrous basis:
1.03CuO, 0.22Cs$_2$O, Al$_2$O$_3$, 33SiO$_2$

COMPARATIVE EXAMPLE 2

The same procedure was followed as in Example 1 to prepare the Comparative catalyst 2, except that a trimethylchlorosilane liquid phase treatment was performed instead of the trimethylchlorosilane vapor treatment. The trimethylchlorosilane liquid phase treatment was performed as follows:

A 10 g amount of cesium ion-exchanged ZSM-5 were mixed in 100 g of an aqueous solution containing 0.5 g of trimethylchlorosilane. This mixture was stirred at 60° C. for 20 hours and then the solid product was washed.

The molar ratio of the SiO$_2$/Al$_2$O$_3$ of the zeolite treated with an aqueous solution of trimethylchlorosilane was 36.

The Comparative catalyst 2 (after the copper ion-exchange) had the following composition expressed by the molar ratio of the oxides on an anhydrous basis:
0.67CuO, 0.09Cs$_2$O, Al$_2$O$_3$, 36SiO$_2$

COMPARATIVE EXAMPLE 3

The same procedure was followed as in Example 7 using the Comparative catalysts 1 and 2 obtained in Comparative Examples 1 and 2 and the durability of the catalysts was evaluated. The results are shown in Table 3.

TABLE 3

| Catalyst No. | NOx conversion (%) | | |
| --- | --- | --- | --- |
| | 300° C. | 400° C. | 500° C. |
| Comp. catalyst 1 | 0 | 4 | 14 |
| Comp. catalyst 2 | 0 | 3 | 12 |

EXAMPLE 8

An aqueous solution of sodium silicate (250 g/liter of SiO$_2$, 82 g/liter of Na$_2$O, and 2.8 g/liter of Al$_2$O$_3$) and an aqueous solution of aluminum sulfate (8.8 g/liter of Al$_2$O$_3$ and 370 g/liter of H$_2$SO$_4$) were continuously fed with stirring at rates of 3 liter/hr and 1 liter/hr, respectively, into an overflow type reactor of a net capacity of 2 liters. The reaction temperature was 30° to 32° C. and the pH of the discharged slurry was 6.7 to 7.0.

The discharged slurry was subjected to liquid-solid separation and sufficiently washed, then a uniform granular amorphous aluminosilicate compound of 0.75% by weight of Na$_2$O, 0.77% by weight of Al$_2$O$_3$, 36% by weight of $SiO_2$, and 62.5% by weight of $H_2O$ was obtained. A 2860 g amount of the uniform compound and 6150 g of an aqueous 3.2wt % NaOH solution were charged into an autoclave and crystallized under stirring at 160° C. for 72 hours. The product was subjected to liquid-solid separation, washed with water, and dried to obtain the ZSM-5 type zeolite. As a result of chemical analysis, the zeolite had the following composition expressed by the molar ratio of oxides on an anhydrous basis:

$1.3Na_2O, Al_2O_3, 41SiO_2$

A 10 g amount of the zeolite was added to 100 cc of an aqueous solution containing 2 g of $NH_4Cl$. This mixture was stirred at 60° C. for 20 hours, then the solid product was washed and dried, to provide an ammonium ion-exchanged zeolite.

A 10 g amount of the ammonium ion-exchanged zeolite was packed in a reaction tube, then this was pretreated under a helium flow at 500° C. for 1 hour to remove the $H_2O$ adsorbed on the zeolite. Next, 60 cc/min of helium gas containing 5% tetramethoxysilane was passed through a zeolite bed at 70° C. for 1 hour. Thereafter, the sample was calcined at 500° C. for 2 hours under an air stream. The molar ratio of the $SiO_2/Al_2O_3$ of the treated zeolite was 42.

The zeolite treated with the tetramethoxysilane vapor was added to 41 cc of an aqueous solution of 0.1 mol/liter copper acetate, and this mixture was adjusted to a pH of 10.5 by adding ammonia water and stirred at room temperature for 20 hours, then the solid product was washed, to subject to a copper ion-exchange operation. The operation was repeated two times, then the sample was dried to obtain the catalyst 7. As a result of chemical analysis, the zeolite had the following composition expressed by the molar ratio of the oxides on an anhydrous basis:

$1.06CuO, Al_2O_3, 42SiO_2$

EXAMPLE 9

The same procedure was followed as in Example 8 to prepare a catalyst 8, except that potassium ion-exchange was performed instead of ammonium ion-exchange. The potassium ion-exchange was performed by adding 10 g of ZMS-5 type zeolite to 100 cc of an aqueous solution containing 2.8 g of potassium chloride, stirring this mixture at 60° C. for 20 hours, then washing, repeating this operation two times, then drying.

The molar ratio of the $SiO_2/Al_2O_3$ of the tetramethoxysilane vapor treated zeolite was 42.

The catalyst 8 (after the copper ion-exchange) had the following composition expressed by the molar ratio of the oxides on an anhydrous basis:

$1.02CuO, 0.2K_2O, Al_2O_3, 42SiO_2$

EXAMPLE 10

The same procedure was followed as in Example 8 to prepare a catalyst 9, except that, instead of the tetramethoxysilane vapor treatment, a methoxytrimethylsilane vapor treatment was performed by passing 60 cc/min of helium gas containing 10% methoxytrimethylsilane through the zeolite bed at room temperature for one hour.

The molar ratio of the $SiO_2/Al_2O_3$ of the methoxytrimethylsilane vapor treated zeolite was 42.

The catalyst 9 (after the copper ion-exchange) had the following composition expressed by the molar ratio of the oxides on an anhydrous basis:

$1.20CuO, Al_2O_3, 42SiO_2$

EXAMPLE 11

The same procedure was followed as in Example 8 to prepare a catalyst 10, except that, instead of the tetramethoxysilane vapor treatment, a dimethoxydimethylsilane vapor treatment was performed by passing 60 cc/min of He gas containing 10% dimethoxydimethylsilane through the zeolite bed at room temperature for 1 hour.

The molar ratio of the $SiO_2/Al_2O_3$ of the dimethoxydimethylsilane vapor treated zeolite was 42.

The catalyst 10 (after the copper ion-exchange) had the following composition expressed by the molar ratio of the oxides on an anhydrous basis:

$1.12CuO, Al_2O_3, 42SiO_2$

EXAMPLE 12

The same procedure was followed as in Example 8 to prepare a catalyst 11, except that, instead of the tetramethoxysilane vapor treatment, a tetraethoxysilane vapor treatment was performed by passing 60 cc/min of helium gas containing 5% tetraethoxysilane through the zeolite bed at 70° C. for 1 hour.

The molar ratio of the $SiO_2/Al_2O_3$ of the tetraethoxysilane vapor treated zeolite was 42.

The catalyst 11 (after the copper ion-exchange) had the following composition expressed by the molar ratio of the oxides on an anhydrous basis:

$1.10CuO, Al_2O_3, 42SiO_2$

EXAMPLE 13

The same procedure was followed as in Example 8 to prepare a catalyst 12, except that, instead of the copper ion-exchange, a cobalt ion-exchange was carried out. The cobalt ion-exchange was performed as follows:

The tetramethoxysilane vapor treated zeolite was added to 90 cc of an aqueous solution of 0.22 mol/liter of cobalt (II) acetate, and this mixture was stirred at 60° C. for 20 hours, then the solid product was washed, to subject to a cobalt ion-exchange. This operation was repeated two times, then the sample was dried to obtain the catalyst 12.

The catalyst 12 had the following composition expressed by the molar ratio of the oxides on an anhydrous basis:

$1.43CoO, Al_2O_3, 42SiO_2$

EXAMPLE 14

The activity and the durability were evaluated using the catalysts 7 to 12 obtained in Examples 8 to 13.

Each catalyst was press-molded and then pulverized to regulate the size of granules to 12 to 20 mesh. A 2 cc volume of each of the granular catalysts was packed in an atmospheric fixed bed reaction tubes, then a gas (Table 1) simulating the exhaust gas of a lean burn engine was passed at a space velocity of 120,000/hr. The samples were pretreated at 550° C. for 30 minutes, then the steady-state purification activities at different temperatures were measured. The steady-state purification activity was expressed by the $NO_x$ conversion after holding at each temperature for 1 hour.

Further, the endurance treatment was carried out at 800° C. for 5 hours, on-stream with flowing the gas of the composition of Table 1 at a space velocity of 120,000/hr. Thereafter, the same method as above was used to measure the steady-state purification activity, and to test the durability.

The results are shown in Table 4.

TABLE 4

| Catalyst No. | NOx conversion before endurance treatment (%) | | | NOx conversion after endurance treatment (%) | | |
|---|---|---|---|---|---|---|
| | 300° C. | 400° C. | 500° C. | 300° C. | 400° C. | 500° C. |
| Catalyst 7 | 25 | 42 | 40 | 3 | 14 | 25 |
| Catalyst 8 | 24 | 43 | 41 | 4 | 13 | 24 |
| Catalyst 9 | 31 | 42 | 39 | 4 | 14 | 25 |
| Catalyst 10 | 29 | 41 | 39 | 3 | 14 | 24 |
| Catalyst 11 | 28 | 42 | 40 | 3 | 13 | 23 |
| Catalyst 12 | 8 | 30 | 52 | 4 | 12 | 22 |

COMPARATIVE EXAMPLE 4

The same procedure was followed as in Example 8 to obtain a Cu ion-exchanged ZSM-5 (Comparative catalyst 3), except that the tetramethoxysilane vapor treatment in Example 8 was not performed. Chemical analysis showed that the composition was as follows expressed by the molar ratio of the oxides on an anhydrous basis:
1.03CuO, Al$_2$O$_3$, 41SiO$_2$

COMPARATIVE EXAMPLE 5

The same procedure was followed as in Example 13 to obtain a Co ion-exchanged ZSM-5 (Comparative catalyst 4), except that the tetramethoxysilane vapor treatment in Example 13 was not performed. Chemical analysis showed that the composition was as follows, expressed by the molar ratio of the oxides on an anhydrous basis:
1.40CoO, Al$_2$O$_3$, 41SiO$_2$

COMPARATIVE EXAMPLE 6

The same procedure was followed as in Example 14 using the comparative catalysts 3 and 4 obtained in Comparative Examples 4 and 5 and the activity and the durability of the catalysts were evaluated. The results are shown in Table 5.

TABLE 5

| Catalyst No. | NOx conversion before endurance treatment (%) | | | NOx conversion after endurance treatment (%) | | |
|---|---|---|---|---|---|---|
| | 300° C. | 400° C. | 500° C. | 300° C. | 400° C. | 500° C. |
| Comp. catalyst 3 | 20 | 40 | 36 | 1 | 5 | 16 |
| Comp. catalyst 4 | 1 | 20 | 50 | 1 | 7 | 17 |

EXAMPLE 15

The same procedure was followed as in Example 8 to prepare the ammonium ion-exchanged zeolite.

A 10 g amount of the ammonium ion-exchanged zeolite were packed in a reaction vessel, then this was pretreated under vacuum at 400° C. for 1 hour to remove the H$_2$O adsorbed on the zeolite. Next, 40 cc/min of toluene containing 0.7% tetramethoxysilane was added dropwise to the reaction vessel in a nitrogen atmosphere. Thereafter, the mixture was stirred and refluxed at 117° C. for 1 hour. The treated zeolite was filtered, then was calcined at 600° C. for 1 hour under an air flow. The molar ratio of the SiO$_2$/Al$_2$O$_3$ of the treated zeolite was 42.

The zeolite treated with the tetramethoxysilane was added to 41 cc of an aqueous solution of 0.1 mol/liter copper acetate, and this mixture was adjusted to a pH of 10.5 by adding ammonia water and stirred at room temperature for 20 hours, then the solid product was washed, to subject to a copper ion-exchange operation. The operation was repeated two times, then the sample was dried to obtain the catalyst 13. As a result of chemical analysis, the catalyst had the following composition expressed by the molar ratio of the oxides on an anhydrous basis:
0.94CuO, Al$_2$O$_3$, 42SiO$_2$

EXAMPLE 16

The same procedure was followed as in Example 15 to prepare a catalyst 14, except that potassium ion-exchange was performed instead of ammonium ion-exchange. The potassium ion-exchange was performed by adding 10 g of ZMS-5 type zeolite to 100 cc of an aqueous solution containing 2.8 g of potassium chloride, agitating this mixture at 60° C. for 20 hours, then washing, repeating this operation two times, then drying.

The molar ratio of the SiO$_2$/Al$_2$O$_3$ of the tetramethoxysilane treated zeolite was 42.

The catalyst 14 (after the copper ion-exchange) had the following composition expressed by the molar ratio of the oxides on an anhydrous basis:
0.97CuO, 0.14K$_2$O, Al$_2$O$_3$, 42SiO$_2$

EXAMPLE 17

The same procedure was followed as in Example 15 to prepare a catalyst 15, except that, instead of the treatment by a toluene containing tetramethoxysilane, treatment was performed by toluene containing 0.9% of tetraethoxysilane.

The molar ratio of the SiO$_2$/Al$_2$O$_3$ of the tetraethoxysilane treated zeolite was 42.

The catalyst 15 (after the copper ion-exchange) had the following composition expressed by the molar ratio of the oxides on an anhydrous basis:
0.89CuO, Al$_2$O$_3$, 42SiO$_2$

EXAMPLE 18

The same procedure was followed as in Example 15 to obtain the catalyst 16, except that a cobalt ion-exchange was performed instead of the copper ion-exchange. The cobalt ion-exchange was performed as follows:

The zeolite treated with the tetramethoxysilane was added to 90 cc of an aqueous solution of 0.22 mol/liter cobalt (II) acetate, and this mixture was stirred at 60° C. for 20 hours, then the solid product was washed, to subject to a cobalt ion-exchange. The operation was repeated two times, then the zeolite was dried to obtain the catalyst 16.

The catalyst 16 had the following composition expressed by the molar ratio of the oxides on an anhydrous basis:
1.43CoO, Al$_2$O$_3$, 42SiO$_2$

EXAMPLE 19

The same procedure was followed as in Example 14 using the catalysts 13 to 16 obtained in Examples 15 to 18 and the activity and the durability were evaluated.

The results are shown in Table 6.

TABLE 6

| Catalyst No. | NOx conversion before endurance treatment (%) | | | NOx conversion after endurance treatment (%) | | |
|---|---|---|---|---|---|---|
| | 300° C. | 400° C. | 500° C. | 300° C. | 400° C. | 500° C. |
| Catalyst 13 | 23 | 41 | 40 | 3 | 10 | 20 |
| Catalyst 14 | 24 | 42 | 39 | 2 | 12 | 23 |
| Catalyst 15 | 23 | 40 | 40 | 3 | 11 | 21 |
| Catalyst 16 | 5 | 25 | 52 | 2 | 10 | 22 |

COMPARATIVE EXAMPLE 7

The same procedure was followed as in Example 15 to obtain the Comparative catalyst 5, except that when performing the tetramethoxysilane treatment in Example 15, the solvent used was made water instead of toluene and the mixture was stirred at 100° C. for 1 hour. As a result of chemical analysis, the catalyst had the following composition expressed by the molar ratio of oxides on an anhydrous basis:
1.05CuO, $Al_2O_3$, 42$SiO_2$

COMPARATIVE EXAMPLE 8

The same procedure was followed as in Example 14 using the Comparative catalyst 5 obtained in Comparative Example 7 and the activity and the durability of the catalyst were evaluated. The results are shown in Table 7.

TABLE 7

| Catalyst No. | NOx conversion before endurance treatment (%) | | | NOx conversion after endurance treatment (%) | | |
|---|---|---|---|---|---|---|
| | 300° C. | 400° C. | 500° C. | 300° C. | 400° C. | 500° C. |
| Comp. catalyst 5 | 22 | 40 | 37 | 1 | 5 | 19 |

EXAMPLE 20

The same procedure was followed as in Example 8 to prepare the ZSM-5 type zeolite. As a result of chemical analysis, the catalyst had the following composition expressed by the molar ratio of oxides on an anhydrous basis:
1.3$Na_2O$, $Al_2O_3$, 41$SiO_2$ A 10 g amount of the zeolite was added to 100 cc of an aqueous solution containing 6.4 g of cesium chloride. This mixture was stirred at 60° C. for 20 hours, then the solid product was washed and dried, to provide a cesium ion-exchanged zeolite.

The cesium ion-exchanged zeolite was packed in a reaction tube, then this was pretreated under a helium flow at 500° C. for one hour to remove the $H_2O$ adsorbed on the zeolite. Next, 60 cc/min of helium gas containing 5% silicon tetrachloride was passed through a zeolite bed at 100° C. for two hours. The molar ratio of the $SiO_2/Al_2O_3$ of the treated zeolite was 41. The potassium ion-exchange capacity of the treated zeolite was investigated and found to be 100%. No dealumination could be observed.

The zeolite treated by the silicon tetrachloride vapor was added to 41 cc of an aqueous solution of 0.1 mol/liter copper acetate, and this mixture was adjusted to a pH of 10.5 by adding ammonia water and stirred at room temperature for 20 hours, then the solid product was washed, to subject to a copper ion-exchange operation. The operation was repeated two times, then the samples was dried to obtain the catalyst 17. As a result of chemical analysis, the catalyst had the following composition expressed by the molar ratio of the oxides on an anhydrous basis:
1.02CuO, 0.18$Cs_2O$, $Al_2O_3$, 41$SiO_2$

EXAMPLE 21

The same procedure was followed as in Example 20 to prepare a catalyst 18, except that potassium ion-exchange was performed instead of the cesium ion-exchange. The potassium ion-exchange was performed by adding 10 g of ZMS-5 type zeolite to 100 cc of an aqueous solution containing 2.8 g of potassium chloride, agitating this mixture at 60° C. for 20 hours, then washing, repeating this operation two times, then drying.

The molar ratio of the $SiO_2/Al_2O_3$ of the silicon tetrachloride vapor treated zeolite was 41. Further, the sodium ion-exchange capacity of the treated zeolite was investigated and found to be 97%. Almost no dealumination could be observed.

The catalyst 18 (after the coper ion-exchange) had the following composition expressed by the molar ratio of the oxides on an anhydrous basis:
1.03CuO, 0.11$K_2O$, $Al_2O_3$, 41$SiO_2$

EXAMPLE 22

The same procedure was followed as in Example 20 to prepare a catalyst 19, except that, instead of the cesium ion-exchange, ammonium ion-exchange was performed. The ammonium ion-exchange was performed by adding 10 g of ZSM-5 type zeolite to 100 cc of aqueous solution containing 2 g of $NH_4Cl$, agitating at 60° C. for 20 hours, then washing, repeating this operation two times, then drying.

The molar ratio of the $SiO_2/Al_2O_3$ of the silicon tetrachloride vapor treated zeolite was 41. The potassium ion-exchanged capacity of the treated zeolite was investigated and found to be 94%. Almost no dealumination could be observed.

The catalyst 19 (after the copper ion-exchange) had the following composition expressed by the molar ratio of the oxides on an anhydrous basis:
1.13CuO, $Al_2O_3$, 41$SiO_2$

EXAMPLE 23

The same procedure was followed as in Example 20 to prepare a catalyst 20, except that, instead of the copper ion-exchange, cobalt ion-exchange was carried out. The cobalt ion-exchange was performed as follows:

The silicon tetrachloride vapor treated zeolite was added to 90 cc of an aqueous solution of 0.22 mol/liter of cobalt (II) acetate, and this mixture was stirred at 60° C. for 20 hours, then the solid product was washed, to subject to a cobalt ion-exchange. This operation was repeated two times, then the sample was dried to obtain the catalyst 20.

The catalyst 20 had the following composition expressed by the molar ratio of the oxides on an anhydrous basis:
1.45CoO, $Al_2O_3$, 41$SiO_2$

EXAMPLE 24

The same procedure was followed as in Example 14 using the catalysts 17 to 20 obtained in Examples 20 to 23 and the activity and the durability were evaluated.
The results are shown in Table 8.

TABLE 8

| Catalyst No. | NOx conversion before endurance treatment (%) | | | NOx conversion after endurance treatment (%) | | |
|---|---|---|---|---|---|---|
| | 300° C. | 400° C. | 500° C. | 300° C. | 400° C. | 500° C. |
| Catalyst 17 | 30 | 45 | 42 | 3 | 18 | 27 |
| Catalyst 18 | 25 | 43 | 40 | 2 | 13 | 22 |
| Catalyst 19 | 24 | 42 | 39 | 2 | 10 | 21 |
| Catalyst 20 | 9 | 32 | 54 | 4 | 14 | 23 |

COMPARATIVE EXAMPLE 9

The same procedure was followed as in Example 23 to obtain a Co ion-exchanged ZSM-5 (Comparative catalyst 6), except that the silicon tetrachloride vapor treatment in Example 23 was not performed. Chemical analysis showed that the composition was as follows expressed by the molar ratio of the oxides on an anhydrous basis:

1.40CoO, $Al_2O_3$, 41$SiO_2$

COMPARATIVE EXAMPLE 10

The same procedure was followed as in Example 20, to obtain the comparative catalyst 7 except that ammonium silicofluoride liquid phase treatment was performed instead of the silicon tetrachloride vapor treatment of Example 20. The ammonium silicofluoride liquid phase treatment was performed as follows:

A 10 g amount of ZSM-5 type zeolite was added to 250 cc of an aqueous solution of 0.2 mol/liter ammonium silicofluoride. This mixture was stirred at 90° C. for 20 hours, then the solid product washed. The molar ratio of the $SiO_2/Al_2O_3$ of the resultant zeolite was 43. The potassium ion-exchange capacity of the treated zeolite was investigated and found to be 85%. Dealumination was observed.

The Comparative catalyst 7 (after Cu ion-exchange) had the following composition expressed by the molar ratio of the oxides on an anhydrous basis:

1.05CuO, $Al_2O_3$, 43$SiO_2$

COMPARATIVE EXAMPLE 11

The same procedure was followed as in Example 14 using the Comparative catalysts 6 and 7 obtained in Comparative Examples 9 and 10 and the activity and the durability of the catalysts was evaluated. The results are shown in Table 9.

TABLE 9

| Catalyst No. | NOx conversion before endurance treatment (%) | | | NOx conversion after endurance treatment (%) | | |
|---|---|---|---|---|---|---|
| | 300° C. | 400° C. | 500° C. | 300° C. | 400° C. | 500° C. |
| Comp. catalyst 6 | 1 | 20 | 50 | 1 | 7 | 17 |
| Comp. Catalyst 7 | 22 | 41 | 38 | 2 | 7 | 18 |

EXAMPLE 25

The same procedure was followed as in Example 8 to prepare an ammonium ion-exchanged zeolite.

A 10 g amount of the ammonium ion-exchanged zeolite were packed in a reaction vessel, then this was pretreated under vacuum at 400° C. for one hour to remove the $H_2O$ adsorbed on the zeolite. Next, 40 cc of hexane containing 5% silicon tetrachloride was dropwise added to the reaction vessel. This mixture was stirred at room temperature for 20 hours, then was dried under reduced pressure at 40° C. The treated zeolite was washed with 0.1N hydrochloric acid aqueous solution, then was washed with pure water, then calcined at 600° C. for one hour in an air flow. The molar ratio of the $SiO_2/Al_2O_3$ of the treated zeolite was 42.

The zeolite treated by the silicon tetrachloride was added to 100 cc of an aqueous solution containing 0.7 g of copper acetate, and this mixture was adjusted to a pH of 10.5 by adding ammonia water and stirred at room temperature for 20 hours, then the solid product was washed, to subject to a copper ion-exchange operation. The operation was repeated two times, then the sample was dried to obtain the catalyst 21. As a result of chemical analysis, the catalyst had the following composition expressed by the molar ratio of the oxides on an anhydrous basis:

1.35CuO, $Al_2O_3$, 42$SiO_2$

EXAMPLE 26

A 10 g amount of the ZSM-5 type zeolite synthesized in Example 25 was added to 100 cc of an aqueous solution containing 14 g of cesium chloride, and this mixture was stirred at 60° C. for 20 hours, then the solid product was washed and dried, to subject to a cesium ion-exchange. The operation was repeated three times, then the sample was dried to obtain the cesium ion-exchanged zeolite.

The same procedure was performed as in Example 25 to perform the silicon tetrachloride treatment except that 10 g of the Cs ion-exchanged zeolite was used and 40 cc of hexane containing 14% of silicon tetrachloride was used.

The treated zeolite was added to 100 cc of an aqueous solution containing 2 g of $NH_4Cl$. This mixture was stirred at 60° C. for 20 hours, then the solid product was washed and dried, to subject to an ammonium ion-exchange.

After this, the same procedure was followed as in Example 25 to perform a copper ion-exchange operation. The resultant catalyst 22 had the following composition expressed by the molar ratio of the oxides on an anhydrous basis:

2.04CuO, $Al_2O_3$, 42$SiO_2$

EXAMPLE 27

The Cs ion-exchanged zeolite obtained in Example 26 was pretreated in the same way as Example 25, then 40 cc of hexane containing 5 percent of silicon tetrachloride were dropwise added to the reaction vessel under a nitrogen atmosphere. This mixture was stirred at room temperature for 22 hours, then the solid product was filtered and washed with 200 cc of hexane.

The catalyst 23 obtained by subjecting the treated zeolite to ammonium ion-exchange and copper ion-exchange in the same way as Example 26 had the following composition expressed by the molar ratio of the oxides on an anhydrous basis:

1.01CuO, $Al_2O_3$, 41$SiO_2$

EXAMPLE 28

The same procedure was followed as in Example 14 using the catalysts 21 to 23 obtained in Examples 25 to 27 and the activity and the durability were evaluated.

The results are shown in Table 10.

TABLE 10

| Catalyst No. | NOx conversion before endurance treatment (%) | | | NOx conversion after endurance treatment (%) | | |
|---|---|---|---|---|---|---|
| | 300° C. | 400° C. | 500° C. | 300° C. | 400° C. | 500° C. |
| Catalyst 21 | 34 | 42 | 38 | 3 | 13 | 22 |
| Catalyst 22 | 24 | 40 | 36 | 2 | 12 | 22 |
| Catalyst 23 | 22 | 40 | 36 | 3 | 10 | 20 |

COMPARATIVE EXAMPLE 12

The same procedure was followed as in Example 25 to obtain a Cu ion-exchanged ZSM-5 (Comparative catalyst 8), except that use was made of $H_2O$ as the solvent in Example 25. Chemical analysis showed that the composition was as follows expressed by the molar ratio of the oxides on an anhydrous basis:

$1.05CuO, Al_2O_3, 45SiO_2$

COMPARATIVE EXAMPLE 13

The same procedure was followed as in Example 14 using the Comparative catalyst 8 obtained in Comparative Example 11 and the activity and the durability of the catalyst were evaluated. The results are shown in Table 11.

TABLE 11

| Catalyst No. | NOx conversion before endurance treatment (%) | | | NOx conversion after endurance treatment (%) | | |
|---|---|---|---|---|---|---|
| | 300° C | 400° C. | 500° C. | 300° C. | 400° C. | 500° C. |
| Comp. catalyst 8 | 3 | 34 | 35 | 0 | 5 | 17 |

As clear from Tables 2 to 11, according to the process of the present invention, it is possible to efficiently remove nitrogen oxides and it is possible to efficient remove nitrogen oxides even after the catalyst has been used at a high temperature.

We claim:

1. A process for catalytically reducing nitrogen oxides in an oxygen rich exhaust gas stream containing nitrogen oxides and hydrocarbons comprising contacting said gas stream under conditions effective to catalytically reduce said nitrogen oxides with a catalyst comprising at least one active metal and a ZSM-5 zeolite having a molar ratio of $SiO_2/Al_2O_3$ of at least 15, wherein said catalyst is treated by contacting with a vapor of at least one silicon compound selected from the group consisting of alkylchlorosilanes, alkoxysilanes, alkoxyalkylsilanes, and silicon tetrachloride or said catalyst is treated by contacting with an alkoxysilane or silicon tetrachloride in an organic solvent.

2. A process as claimed in claim 1, wherein the active metal is at least one metal selected from the group consisting of the Group Ib, Group VIa, Group VII, or Group VIII of the Periodic Table.

3. A process as claimed in claim 1, wherein the active metal is copper or cobalt.

* * * * *